United States Patent Office 3,298,838
Patented Jan. 17, 1967

3,298,838
PROCESS FOR PRODUCING SOLUBLE CITRUS FRUIT POWDER
Jorge Rivera Villarreal, 37 San Juan de Letran, 8th Floor, Mexico City, Mexico
No Drawing. Filed May 6, 1963, Ser. No. 278,434
6 Claims. (Cl. 99—206)

The present invention relates to a process of producing soluble food powders and more particularly reconstituted soluble citrus fruit powders such as soluble lime powder.

Because of periodic shortages of citrus fruit due to crop freezes and like natural causes and the limited keeping qualities of fresh citrus fruit, serious industrial and commercial shortages of citrus fruit frequently occur particularly affecting the economy of citrus fruit export countries and orchard areas. In the past, no fully satisfactory solution of this problem has been evolved because of the lack of a practical process of producing a soluble citrus powder retaining the food and flavor characteristics of the natural product in spite of the advances in quick freezing preservative practices and on the spot juice making. No fully satisfactory solution of this problem has existed because of the special characteristics of citrus fruit which have prevented the economical processing of such fruit into a soluble powder exhibiting in use all the food and flavor benefits of the natural fruit.

The present invention resides in a process for obtaining soluble citrus fruit powder which in use provides all the food and flavor benefits of natural citrus fruits and at the same time assures a hygienic product having prolonged keeping qualities without the addition of preservatives or special sugars.

Another object of the present invention resides in a process for obtaining soluble citrus fruit powder according to the preceding object which can be inexpensively practiced assuring a product marketable at a reasonable and practical cost.

Still further objects will appear from the following description and appended claims wherein the process is detailed.

The processing of citrus fruits to produce a soluble powder in accord with this invention, contemplates as a first step subjecting a quantity of fresh citrus fruit (the whole fruit) to a thorough washing in a conventional cold water bath to remove surface adherents, such as dust, spray material, and other natural contaminants that might be present, thereby assuring the purity of the end product. The washed fruit is then introduced into a suitable squeezer, for example, a mill preferably of the type which squeezes the fruit and at the same time separates the liquid components, juice, skin oils and gums, from the seeds and bagasse or skin and pulp. These separated liquid components made up of the skin oils and gums as well as the pulp juice, are then centrifuged in any conventional high speed centrifuge (preferably for example at 30,000 r.p.m.) to separate in well known manner the liquid components into their constituent oils, gums and pulp juice. The separated components are then separately dehydrated in any suitable vacuum type dehydrator at applied temperatures in the range of 30° to 50° C. This dehydration step results in the loss by evaporation of the water component and the natural vitamin "C" and leaves a concentrated molasses-like residue.

These separate residues are then subjected to a powdering process in any suitable and well known spray drying or equivalent machine whereby the separate residues are reduced separately to powder form herein designated as citrus juice powder and citrus oil powder. The resulting powders are then put together, and a suitable colored harmless food dye and vitamin "C" in any acceptable powdered concentrate are added in the necessary proportion determinable by experiment, to replace the natural coloring and vitamin "C" lost during the dehydration step. The resulting powder mix, including the retained natural emulsifiers and clouding agents, is thoroughly mixed and then homogenized by heat of the order of one hundred twenty degrees centigrade (120° C.). The resulting reconstituted powder is a soluble powder which can be stored or packed in containers and kept for substantial periods of time without danger of spoilage or loss of the natural fruit flavor and food value. Upon addition of water the powder readily dissolves and by the addition of water in regulated varying amounts, the powder can be converted to juice of varying concentrations for use in cooking and flavoring food products and drinks and also in producing full flavored fruit juice beverages as desired.

A specific example of the constituents of a batch of soluble lime powder produced by this invention is as follows:

| Mineral salts: | Mlgs. |
|---|---|
| Calcium | 50.0 |
| Phosphorus | 70.0 |
| Iron | 1.9 |
| Potassium | 30.0 |
| Magnesium | 50.0 |
| Cobalt | 1.0 |
| Manganese | 1.0 |
| Sodium | 30.0 |
| Zinc | 1.0 |
| Vitamins: | |
| C (Ascorbic acid) | 350.00 |
| Carotene | 0.03 |
| Flavonoids | 100.00 |
| $B_1$ (Thiamine chloride) | 0.01 |
| $B_2$ (Riboflavina) | 0.01 |
| Niacine | 0.019 |

The physical characteristics are as follows:
Ph=1.8.
Brix number 6.5 at 1 to 10 dilution at 22° C.
Turbidity in a 1 to 100 dilution is equivalent to an optical density of +0.2 with a 540 mu filter.
Standardized product in color and odor.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by Letters Patent is:

1. A process for forming a soluble citrus fruit powder free from preservative additives and having the food and flavor characteristics of the natural fruit comprising the steps of subjecting the whole fruit to a cold water bath to remove surface adherents; subjecting the washed fruit to a squeezing action to separate the liquid components from the skin, seeds and pulp; centrifuging the liquid components to separate the liquid components into its constituent skin oils, gum and pulp juice; separately dehydrating the resulting constituents thereby forming separate vitamin free concentrated residues; subjecting the separated concentrated residues to spray drying to reduce each to powder form; mixing the resulting powders together while adding vitamin C and food coloring in powder form; and homogenizing the resulting powder mix to obtain the powder in final form.

2. The process of claim 1 wherein the coloring and vitamin C additives included in the mixing step are proportioned to the other powder components to assure replacement of the coloring and vitamin C lost in the proceeding steps of the process.

3. The process of claim 1 wherein the centrifuging step is carried out at speeds of the order of 30,000 r.p.m.

4. The process of claim 1 wherein the dehydration of the separated constituents is conducted in a vacuum type dehydrator at applied temperatures within the range of 30° to 50° C.

5. The process of claim 1 wherein the homogenizing is accomplished at temperatures of the order of 120° C.

6. A process for forming a soluble citrus fruit powder free from preservative additives and having the food and flavor characteristics of the natural fruit comprising the steps of subjecting the whole fruit to a cold water bath to remove surface adherents; subjecting the washed fruit to a squeezing action to separate the liquid components from the skin, seeds and pulp; centrifuging the liquid components at a centrifuging speed of the order of 30,000 r.p.m. to separate the liquid components into its constituent skin oils, gum and pulp juice; separately dehydrating the separated constituents in a vacuum type dehydrator at applied temperatures within the range of 30° to 50° C. thereby forming separate vitamin free concentrated residues; subjecting the separated concentrated residues to spray drying to reduce each to powder form; mixing the resulting powders together while adding vitamin C and food coloring in powder form; and homogenizing the resulting powder mix at temperatures of the order of 120° C. to obtain the powder in final form.

References Cited by the Examiner
UNITED STATES PATENTS

| | | | |
|---|---|---|---|
| 2,332,735 | 10/1943 | Lyons | 99—78 |
| 2,367,131 | 1/1945 | Leo et al. | 99—206 |
| 2,567,038 | 9/1951 | Stevens et al. | 99—206 |

A. LOUIS MONACELL, *Primary Examiner.*

R. S. AULL, *Assistant Examiner.*